US012573159B2

(12) United States Patent
Challapalli

(10) Patent No.: US 12,573,159 B2
(45) Date of Patent: *Mar. 10, 2026

(54) FUTURE POSE PREDICTOR FOR A CONTROLLER

(71) Applicant: QUALCOMM Incorporated, San Diego, CA (US)

(72) Inventor: Niharika Challapalli, Conroe, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/009,846

(22) Filed: Jan. 3, 2025

(65) Prior Publication Data

US 2025/0139918 A1 May 1, 2025

Related U.S. Application Data

(63) Continuation of application No. PCT/US2023/076587, filed on Oct. 11, 2023, which is a continuation of application No. 18/057,419, filed on Nov. 21, 2022, now Pat. No. 12,073,521.

(51) Int. Cl.
*G06T 19/00* (2011.01)
*G06F 3/01* (2006.01)
*G06T 15/00* (2011.01)

(52) U.S. Cl.
CPC ............ *G06T 19/006* (2013.01); *G06F 3/011* (2013.01); *G06T 15/00* (2013.01)

(58) Field of Classification Search
CPC ..... G01C 21/1656; G06F 3/011; G06F 3/147; G06F 3/017; G06N 3/044; G06N 3/045; G06N 3/084; G06T 15/00; G06T 19/006; G06T 7/70; H04N 21/6587
See application file for complete search history.

(56) References Cited

U.S. PATENT DOCUMENTS

| | | | |
|---|---|---|---|
| 12,073,521 B2 | 8/2024 | Challapalli | |
| 2017/0032528 A9 | 2/2017 | Menozzi | |
| 2018/0018781 A1 | 1/2018 | Menozzi | |
| 2020/0098186 A1* | 3/2020 | Xue .................. | H04N 21/6587 |

(Continued)

FOREIGN PATENT DOCUMENTS

| | | |
|---|---|---|
| CN | 111766948 A | 10/2020 |
| CN | 113534948 A | 10/2021 |

(Continued)

OTHER PUBLICATIONS

International Search Report and Written Opinion—PCT/US2023/076587—ISA/EPO—May 10, 2024.

*Primary Examiner* — Richard J Hong
(74) *Attorney, Agent, or Firm* — Polsinelli LLP//QUALCOMM Incorporated

(57) ABSTRACT

Systems and techniques are described herein for predicting poses. An apparatus for predicting a pose includes at least one memory and at least one processor coupled to at least one memory and configured to: receive, at a pose estimation engine, pose data from a controller, the pose data including a plurality of previous poses of the controller; and predict, at a first time via the pose estimation engine, a future pose of the controller based on the pose data, the future pose comprising an expected pose of the controller at a second time that is after the first time.

26 Claims, 8 Drawing Sheets

700

Determine A Latency Associated With At Least One Of Transferring Pose Data From A Controller To One Or More Devices Or Processing The Pose Data Via A Pose Estimation Engine Based On The Latency
702

Receive, At The Pose Estimation Engine, The Pose Data From The Controller, The Pose Data Including A Plurality Of Previous Poses Of The Controller
704

Predict, According To The Latency Via The Pose Estimation Engine At A First Time, A Future Pose Of The Controller Based On The Pose Data, The Future Pose Comprising An Expected Pose Of The Controller At A Second Time That Is After The First Time
706

Render, On A Display, An Image Based On The Future Pose
708

(56)     References Cited

U.S. PATENT DOCUMENTS

| | | | |
|---|---|---|---|
| 2021/0055545 A1 | 2/2021 | Rodgers et al. | |
| 2021/0118357 A1* | 4/2021 | Kuwahara | G06F 3/147 |
| 2021/0326584 A1* | 10/2021 | Kim | G06F 3/017 |
| 2021/0378529 A1 | 12/2021 | Colburn et al. | |
| 2022/0070150 A1 | 3/2022 | Haerterich et al. | |
| 2022/0206566 A1 | 6/2022 | Senkal et al. | |
| 2022/0237949 A1 | 7/2022 | Kim et al. | |
| 2023/0133574 A1* | 5/2023 | Kim | G06T 7/70 |
| | | | 345/633 |
| 2023/0177778 A1 | 6/2023 | Rahman et al. | |
| 2023/0214027 A1 | 7/2023 | Erivantcev et al. | |
| 2023/0393650 A1* | 12/2023 | Ajaykumar | G06T 19/006 |

FOREIGN PATENT DOCUMENTS

| | | | |
|---|---|---|---|
| CN | 113947432 A | 1/2022 | |
| KR | 20210022498 A | 3/2021 | |

* cited by examiner

600

Receive, At A Pose Estimation Engine, Pose Data From A Controller, The Pose Data Including A Plurality Of Previous Poses Of The Controller
602

Predict, At A First Time Via The Pose Estimation Engine, A Future Pose Of The Controller Based On The Pose Data, The Future Pose Comprising An Expected Pose Of The Controller At A Second Time That Is After The First Time
604

700

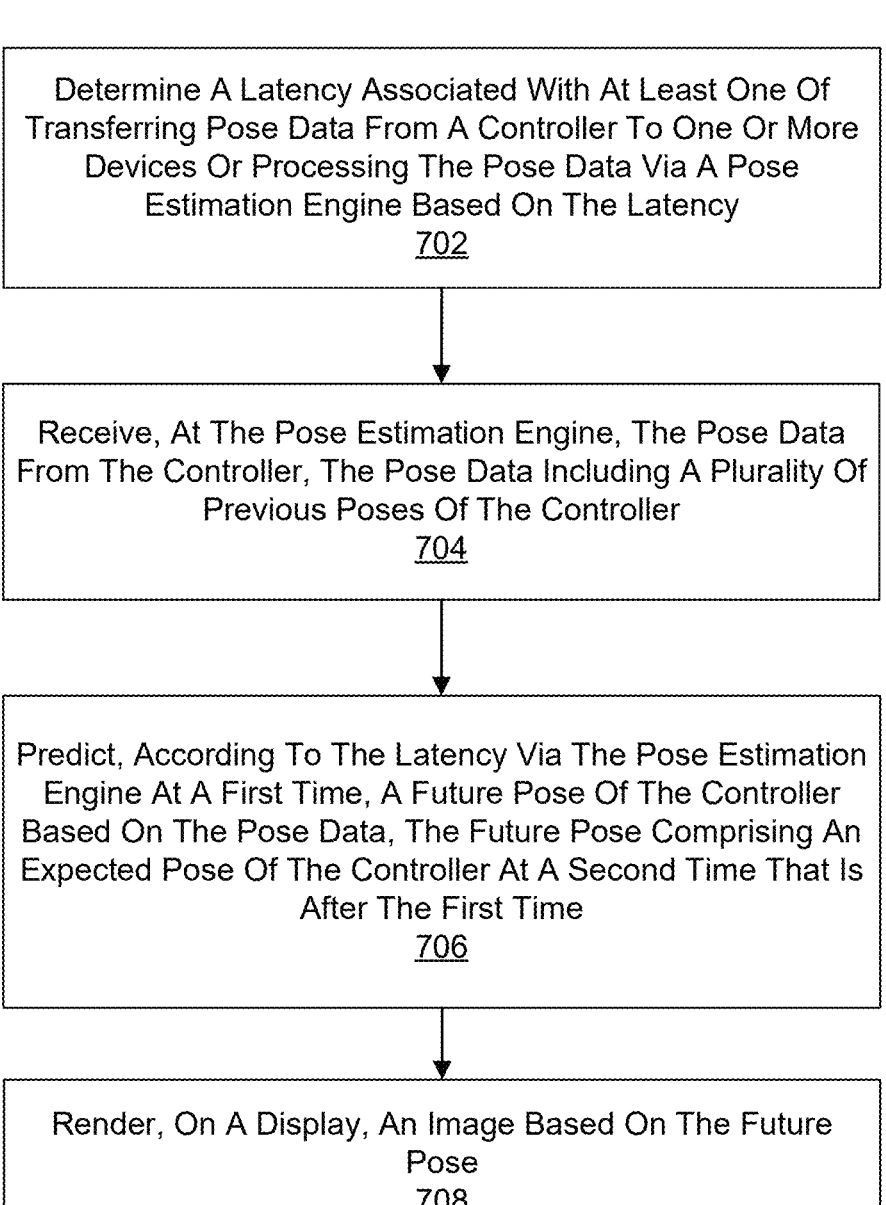

Determine A Latency Associated With At Least One Of
Transferring Pose Data From A Controller To One Or More
Devices Or Processing The Pose Data Via A Pose
Estimation Engine Based On The Latency
702

Receive, At The Pose Estimation Engine, The Pose Data
From The Controller, The Pose Data Including A Plurality Of
Previous Poses Of The Controller
704

Predict, According To The Latency Via The Pose Estimation
Engine At A First Time, A Future Pose Of The Controller
Based On The Pose Data, The Future Pose Comprising An
Expected Pose Of The Controller At A Second Time That Is
After The First Time
706

Render, On A Display, An Image Based On The Future
Pose
708

FIG. 7

FUTURE POSE PREDICTOR FOR A CONTROLLER

CROSS-REFERENCE TO RELATED APPLICATIONS

This application is a continuation, filed under 35 U.S.C. § 365 (c), of Patent Cooperation Treaty (PCT) Application No. PCT/US2023/076587, filed Oct. 11, 2023, which claims priority to U.S. Non-Provisional application Ser. No. 18/057,419, filed Nov. 21, 2022, and granted as U.S. Pat. No. 12,073,521, issued Aug. 27, 2024, both of which are hereby incorporated by reference in their entirety and for all purposes.

TECHNICAL FIELD

The present disclosure generally relates to predicting future poses of a controller in an extended reality system or any other system to enable rendered visual data to match more closely in time with the physical movement of the controller.

BACKGROUND

Extended reality (XR) systems can refer to augmented reality (AR) and virtual reality (VR) or a combination of these concepts, mixed reality (MR). In all these cases, there is a head-mounted display (HMD) that provides the user with XR experience. The user can interact with the XR environment in various ways such as hands, controllers, eyes etc. Controllers are one of the most important use cases for XR as they are used by user to communicate the hand motions and other key interactions which are out of sight of the HMD. In such XR systems, the poses or movements of the controller are sensed by an inertia measurement unit (IMU) and then transferred to HMD for processing and rendering the visual images to the user. Having wireless controllers makes the user experience easy and comfortable, however resulting in data transfer latency which occurs when the wireless control transmits data to headset unlike the wire transfer (faster). In addition to this, there can be a rendering delay between the time of receiving controller pose data and rendering data in the headset based on the pose data.

In some cases, other devices such as a computer are also part of the XR system. The computer can be used to provide processing power for data processing, rendering and so forth. Data transfer from the controller to the headset or some other computer in the system also results in latency. Furthermore, in other cases, raw data might be transferred from the controller to the computer in connect with sensed IMU pose data and the computer may perform calculations to generate visual data to be rendered based on the pose. Such data processing introduces further latency. When the delay due to these various factors reaches around 50 ms between the movement of the controller and rendering visual data associated with the movement, a human can detect or observe the delay which can degrade the user XR experience.

SUMMARY

Systems and techniques are described for a future pose predictor or pose estimation engine that predicts a pose of the controller using a current and past pose. In some cases, the future pose predictor/pose estimation engine does not need to receive velocity information associated with the movement of the controller. In one illustrative example, the pose estimation engine can receive ten samples including a current pose and previous poses in six degrees of freedom and output five samples of future six degrees of freedom poses. The approach can align the actual current movement of the controller with what is rendered on a display and correct for latency issues.

According to at least one example, a method is provided that for predicting a pose, the method including: receiving, at a pose estimation engine, pose data from a controller, the pose data including a plurality of previous poses of the controller; and predicting, at a first time via the pose estimation engine, a future pose of the controller based on the pose data, the future pose including an expected pose of the controller at a second time that is after the first time.

In some aspects, the techniques described herein relate to an apparatus for processing image data, including: at least one memory; and at least one processor coupled to the at least one memory and configured to: receive, via a pose estimation engine, pose data from a controller, the pose data including a plurality of previous poses of the controller; and predict, at a first time via the pose estimation engine, a future pose of the controller based on the pose data, the future pose including an expected pose of the controller at a second time that is after the first time.

In some aspects, the techniques described herein relate to a non-transitory computer-readable medium having stored thereon instructions that, when executed by one or more processors (e.g., configured in circuitry), cause the one or more processors to perform operations including: receive, via a pose estimation engine, pose data from a controller, the pose data including a plurality of previous poses of the controller; and predict, at a first time via the pose estimation engine, a future pose of the controller based on the pose data, the future pose including an expected pose of the controller at a second time that is after the first time.

In some aspects, the techniques described herein relate to an apparatus for classifying image data (e.g., on a mobile device including a processor configured in circuitry), the apparatus including: means for receiving pose data from a controller, the pose data including a plurality of previous poses of the controller; and means for predicting, at a first time, a future pose of the controller based on the pose data, the future pose including an expected pose of the controller at a second time that is after the first time.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 7 is a diagram illustrating an example of another method for operating a pose estimation engine, according to aspects of the disclosure.

DETAILED DESCRIPTION

Figure 1:
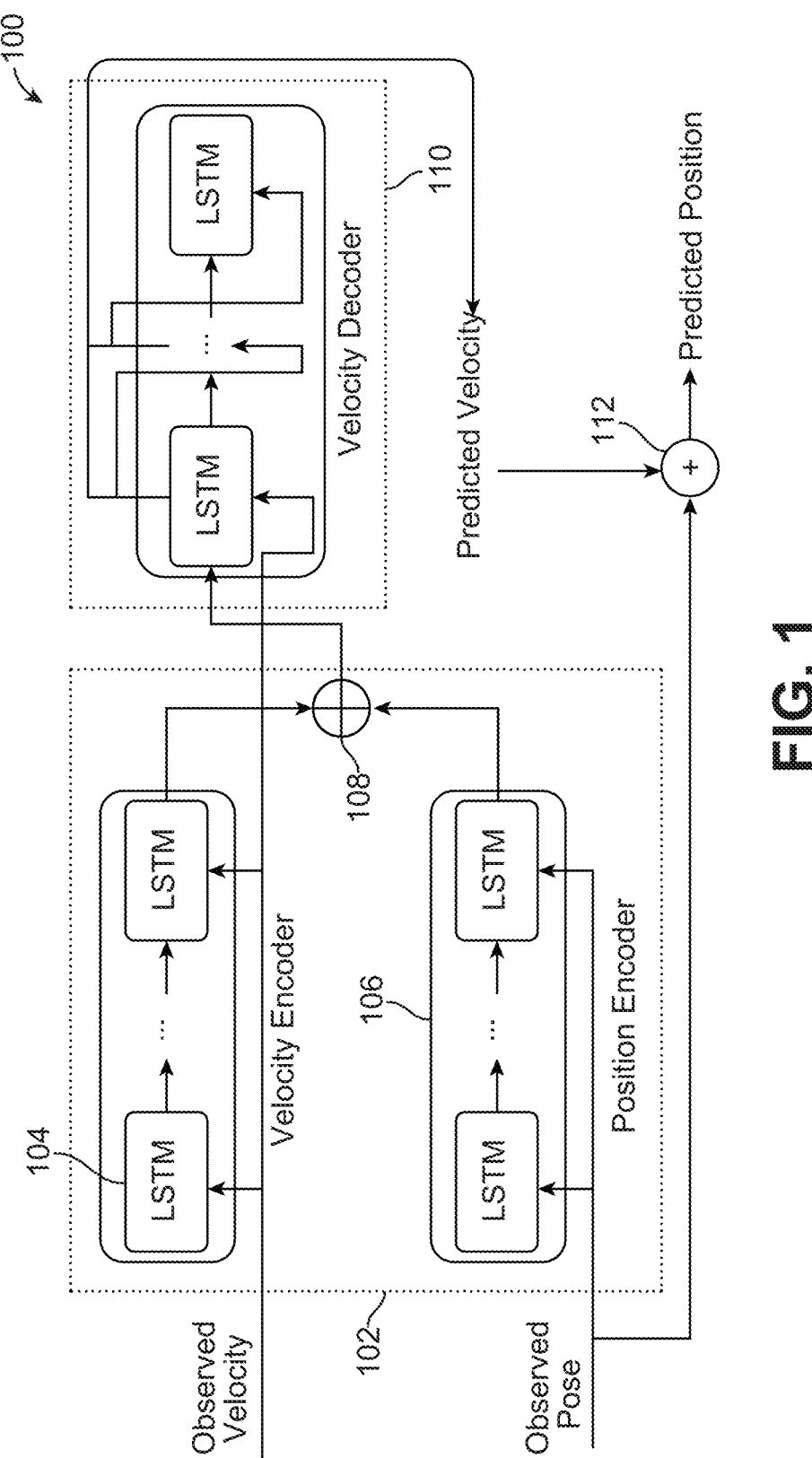
FIG. 1 is a diagram illustrating an example of a network architecture for predicting a position of a pose that utilize an observed velocity, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted previously, extended reality (XR) systems (e.g., virtual reality (VR) systems, augmented reality (AR) systems, and/or mixed reality (MR) systems) cause inherent latencies that can impact the user experience. Data transfer latency can occur when the wireless control transmits data to an XR device (e.g., a headset or head-mounted display, XR glasses such as AR and/or MR glasses, etc.) or to another device. There can be a rendering delay between the time of receiving pose data and rendering data in the XR device based on the pose data. In some cases, other devices such as a computer are also part of the XR system. The computer can be used to provide processing power for data processing, rendering and so forth. Latency occurs every time there is data transfer from the controller to the XR device or some other computer. Furthermore, in other cases, raw data might be transferred from the controller to the computer in connect with sensed IMU pose data and the computer may perform calculations to generate the pose. Thereafter, visual data associated with the generated pose needs to be rendered. This data processing introduces further latency. Humans can detect delays of 50 ms or more which can degrade the user XR experience.

These latencies are problematic in that rendering an image associated with the pose received from the controller may be in the past rather than coordinated in time with the actual movement of the controller. It can be desirable to include a future pose predictor to render the pose based on the received data from the controller such that ultimately the pose that is rendered is very close to the actual movement made the user holding the controller in current time.

In some cases, the company that operates an XR device or computer that receives data from a controller might be different than the company that builds and sells the controller. The system may not have any raw data such as an inertial measurement unit (IMU) data available outside of a pose estimation module. The only data that might be available is the past six degrees of freedom poses provided by the controller with respect to another component, such as an XR device (e.g., a headset or glasses). Companies that provide all the components of an XR system can provide "internal" controllers in that they are able to provide more data about the movement than perhaps what is available from a different company controller or an external controller. This introduces another challenge in these systems is the lack of all the possible data that might be helpful in predicting a future pose. For example, the system may not be able to receive from a controller velocity or acceleration information associated with movement. Such information can be helpful in predicting a future pose but may not be available.

FIG. 1 illustrates an example network architecture 100 that is designed to receive at an encoder 102 an observed velocity. This is an example of a system that operates with an "internal" controller that can provide such data. The observed velocity is processed by one or more long short-term memory (LSTM) neural networks in a velocity encoder 104. Unlike standard feedforward neural networks, the LSTM has feedback connections. Such a recurrent neural network (RNN) can process not only single data points (such as images), but also entire sequences of data (such as speech or video). For example, LSTM is applicable to tasks such as unsegmented, connected handwriting recognition, speech recognition, machine translation, robot control, video games, and healthcare.

The term LSTM refers to the analogy that a standard RNN has both "long-term memory" and "short-term memory". The connection weights and biases in the network change once per episode of training, analogous to how physiological changes in synaptic strengths store long-term memories. The activation patterns in the network change once per time-step, analogous to how the moment-to-moment change in electric firing patterns in the brain store short-term memories. The LSTM architecture aims to provide a short-term memory for the RNN that can last thousands of timesteps, thus "long short-term memory". A common LSTM unit is composed of a cell, an input gate, an output gate and a forget gate. The cell remembers values over arbitrary time intervals and the three gates regulate the flow of information into and out of the cell. The LSTM is one example neural network that is disclosed herein but other networks can be chosen as well and the LSTM is provided only as one possible example.

As shown in FIG. 1, an observed pose is received and processed by one or more LSTMs in a position encoder 106. The output of these two encoders 104, 106 is summed 108 and provided to a velocity decoder 110 having multiple LSTMs. The output predicted velocity is summed 112 with the observed pose to a predicted position. The approach in FIG. 1 has some problems however. In this case, the human pose prediction is defined as predicting the human keypoints locations for future frames, given the observed one for past frames. The method of FIG. 1 is a sequency-to-sequence LSTM model and uses keypoints instead of bounding boxes and does not have an intention decoder.

The system illustrated in FIG. 1 is used for pose prediction (e.g., human pose prediction). For example, the system can determine human keypoint locations by observing past frames and predicts future frames. For this, the system can collect velocity and position information of all the keypoints in the past frame. Using the velocity and position information of all the keypoints in the past frame, the system predicts future velocity and position of those keypoints.

The application of these concepts can be applied for controllers, such as XR controllers. For example, keypoints can be determined for a controller and collecting kinematic information for a controller. There may be different types of controllers that may have different structures, in which case similar keypoints may not be used for the different types of controllers. In some cases, each controller can be trained separately. However, it may be difficult to determine keypoints for the controllers, as a surface of the controllers can be smooth and symmetric and thus may lack distinctive features that can be used as keypoints. Furthermore, it can be difficult to collect data (for use in training each controller) and to obtain kinematic information for each type of controller.

The sequency-to-sequence LSTM model of FIG. 1 takes as input the velocities and the positions of observed past joints or poses and output the predicted velocities of the future joints or poses, from which the future positions can be computed. However, in many cases in practice, the controller is an external controller and not all of this data is available to the other parts of the system. For example, the velocity data is not always observable.

In another aspect, there are challenges with controller motion data. A user's hands can move fast which can introduce jerks and sudden changes in a six degrees of freedom pose which can be difficult to capture with a certain frequency of data collection such as 100 Hz. The approach disclosed herein seeks to receive six degrees of freedom pose data with respect to an XR device (e.g., a VR, AR, and/or MR HMD, an AR and/or MR glasses, etc.) and use the pose data for rendering a visual image associated with the controller movement. One problem with current systems is that the time-series trajectory is not smooth and makes it difficult to learn and predict the future poses without a knowledge of any raw input data such as from the IMU.

Systems, apparatuses, processes (also referred to as methods), and computer-readable media (collectively referred to herein as "systems and techniques") are described herein for predicting one or more future poses (e.g., six degrees of freedom poses) of a controller. For example, the systems and techniques can predict one or more future poses of the controller using the current and past poses (e.g., only the current and past poses) and excluding such data in one example as velocity data and acceleration data. The systems and techniques can address the various problems outlined above, such as the issues of latency and the difficulty of collected data at slower frequencies for quick moving controllers. The systems and techniques can help to implement a solution for both internal and external controllers. In some cases, the systems and techniques can obtain controller pose information (e.g., with respect to an XR device such as a headset or HMD), which can be provided by any type of controller, and can predict the future pose(s) of the controller. For instance, based on the determined future pose(s), the systems and techniques can determine or estimate a trajectory of the controller for rendering purposes.

In some aspects, the systems and techniques can utilize a pose estimation engine or future pose predictor. The pose estimation engine (or future pose predictor) can, in one example, be positioned after a pose estimation algorithm and before a rendering system. The systems and techniques can solve the problem of not having access to any raw input or a sufficient amount of raw input. The use of pose data (e.g., six degrees of freedom data) from the controller with respect to the XR device (e.g., HMD, glasses, etc.) from the past to predict the future trajectory of the controller can be performed so that the rending system can determine or predict a pose at the current time relative to controller movement. Such an approach can overcome the latency issue noted above and can address the issue of less data being available to calculate the trajectory of the controller.

In some aspects, a trained model of the pose estimation engine is trained such that it can operate on current and past poses (e.g., only current and past poses) to determine a future pose and does not need to receive observed velocity and/or acceleration data associated with the controller. One challenge with such an approach is that the six degrees of freedom pose of the controller is predicted with respect to the XR device, which can result in a varied and channeling motion. In addition to the six degrees of freedom pose output from the proposed pose estimation engine, the pose estimation engine can also output a translation velocity and acceleration of the future motion that can be used for various applications. For example, the system may predict intermediate poses such as a pose between 10 ms and 20 ms in the future. The prediction of the future pose is performed with respect to the XR device, in which case the future prediction is associated with a time at which a rendering will occur on the XR device (or any other display) of an image or video associated with the timing of the actual pose or movement of the controller.

The timing can be related to a calculated or expected overall latency. For example, if the data transmission and processing of pose data will take 30 ms from the time the actual pose data is received from the controller and when a rendering associated with the pose will be provided on the display, then the system can utilize the current pose data and perhaps the past 60 ms of pose data and predict a future pose 30 ms into the future and then render that future pose. In one aspect, the controller pose data frequency can be set at a value such as 100-200 Hz which can correspond to an IMU streaming frequency. Thus, the system may receive as input ten past samples and output or predict via the pose estimation engine a future five samples. The benefit of this approach is that when the user sees on the display the rendering of the controller pose predicted by the pose estimation engine, it is more aligned with the actual movement of the controller. The user experience is thus more realistic and current between the controller movement and renderings on the display or XR device.

As noted above, the systems and techniques described herein can predict a future pose associated with a controller using past poses (and in some cases current poses), such as six degrees of freedom (6DOF) pose or position data. The systems and techniques can address the issue of a lack of data that can be received from a controller in an XR or similar system, such as by predicting the future pose based only on past and current 6DOF poses. For example, the systems and techniques include a training process and a pose estimation engine that outputs a certain number of future samples of pose data based on a set of previous samples of pose data. In some aspects, the pose estimation engine includes an input layer, an autoencoder having an encoder and a decoder, and an output layer. The input and output layer can be a fully connected layer (or other dense layer) and the encoder and decoder can each be a respective bi-directional long short-term memory (LSTM) model.

Various aspects of the application will be described with respect to the figures.

Figure 2A:
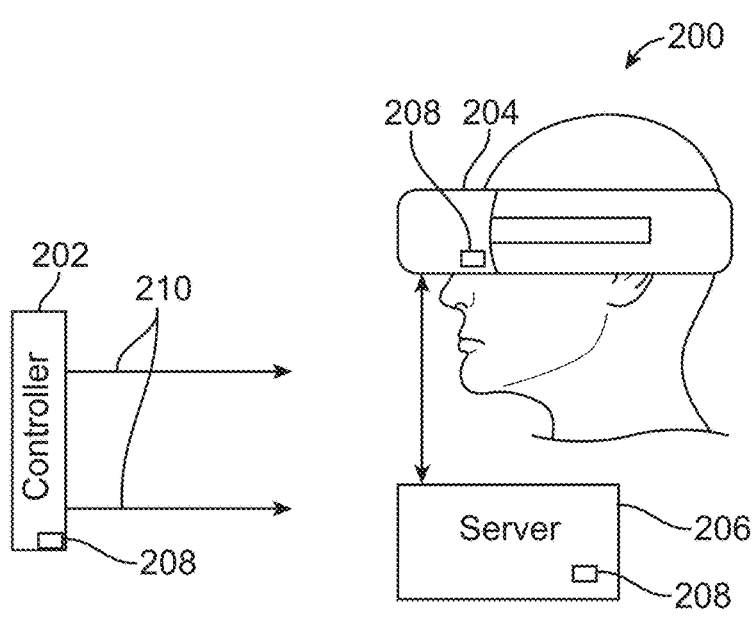
FIG. 2A is a diagram illustrating an example network architecture including a controller, a headset and a computer or server, according to aspects of the disclosure.

FIG. 2A illustrates some of the components 200 that can be used in an extended reality or virtual reality system. For example, a controller 202 can be provided which can be held in a user's had and be used in connection with an extended reality, augmented realist, virtual reality or any other computing or gaming application which can benefit from movement of a device. The controller 202 can include one or more sensors (e.g., one or more inertial measurement units (IMUs), such as one or more gyroscopes, one or more gyrometers, one or more accelerometers, any combination thereof, and/or other sensor. In some examples, the sensor or sensors in the controller 202 will receive or sense pose information which can include positional information such as (x, y, z) coordinates as well as rotational or quaternion information. Quaternion information can relate to a quotient of two directed lines in a three-dimensional space. Quaternions can be used to describe an orientation or rotations in the three-dimensional space using an ordered set of four numbers. They have the ability to uniquely describe any three-dimensional rotation about an arbitrary axis. Four values make up a quaternion, namely x, y, z and q. Three of the values are used to represent the axis in vector format, and the fourth value can be the angle of rotation around the axis.

Figure 2B:
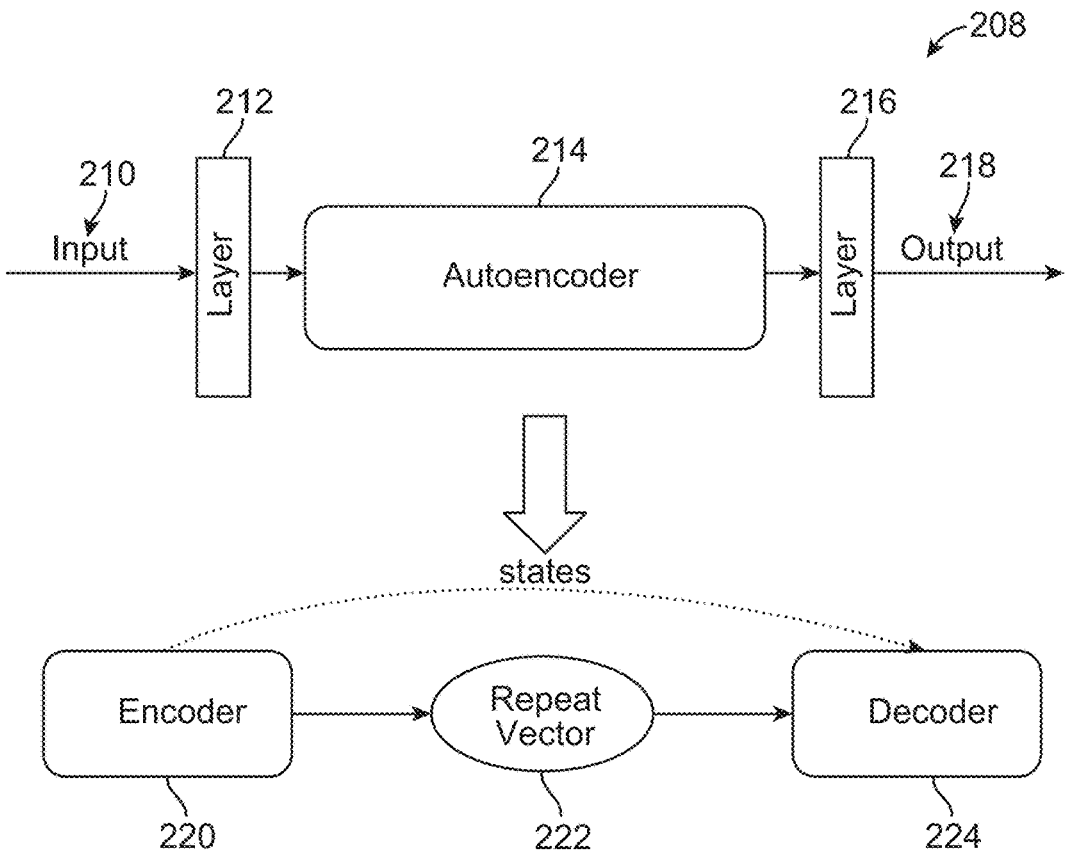
FIG. 2B is a diagram illustrating an example network architecture, according to aspects of the disclosure.

The controller 202 as noted above can be an internal controller which can provide more information than just a pose because it is developer or sold by the same entity that sells the other components and thus is more open to sharing data. The controller 202 may be an external controller that is sold be a separate company which may restrict the data provided to just pose information. The controller 202 can include a wireless communication component which can use Bluetooth or any wireless protocol to communicate signals and data 210 to one or more of a headset 204 (as an example of an XR device) and a computer system or server 206. The headset 204 can include a display, wireless communication module, one or more cameras and computer processor to provide the XR or mixed reality environment for the user. The headset 204 can include a LIDAR sensor and stereo RGB video feed to provide a blending of real and virtual elements. The headset can provide features such as real-time three-dimensional room reconstructions and can construct realistic immersive environments of the surroundings of the user. Data from the controller 202 can be integrated into the environment as viewed in the headset 204. The headset can also include a pose estimation engine 208 as is shown in FIG. 2B. Some systems may only use the controller 202 and the headset 208. Other systems can also include a separate computer or server 206 that can also include a post estimation engine 208.

The pose estimate engine 208 can be configured on any computing component within the overall system 200.

As noted above, latencies can exist due to one or more of wireless transmission of data and data processing and rending computations on the headset 204. Depending on the configuration of the system, these latencies can vary. In one example, the system may determine that the latency is 10-20 ms between the time that a particular motion of the controller 202 was performed and from the time the rending of visual data in the display of the headset 204. When the server 206 is part of the system, the latency might be determined to be 30-40 ms. There may be other factors that cause different latencies based on the particular application, the amount of motion or type of motion experienced by the controller 202 or other factors. One aspect of this disclosure relates to tuning the pose estimation engine 208 based on any one or more factors such as its location in the system (e.g., in the headset 204 or on a separate server 206). The system my receive or calculate a latency value and the provide that data to the pose estimation engine 208. The pose estimation engine can then adjust the number of output samples or adjust how far in the future the predicted poses should extend to more closely align the rendering on the headset 204 with the actual movement of the controller 202.

One example of tuning the pose estimation engine 208 can be where a high speed application is being operated, the system may increase the sampling frequency from 100 Hz to 150 or 200 Hz to capture more data for processing and predicting a future pose. The sample frequency can be adjusted based on any number of factors such as data about a user, an application type, characteristics of the controller 202 or headset 204 or other components, processing power, number of users in an interaction, and so forth.

FIG. 2B illustrates the network architecture of the pose estimation engine 208. The pose estimation engine 208 can have a number of different structures. The input 210 is typically received from the controller 202 as shown in FIG. 2A. The input 210 as mentioned above typically includes pose information such as N number of pose samples over time. The N number of pose samples can be configured to provide just the pose information. The pose information can be the x, y, z coordinates of the controller 202. The input in other aspects can include additional data such as quaternion data related to orientation. For example, the pose data 210 can be in six degrees of freedom and include both position and orientation data. In another example, the pose data 210 might also include velocity information and/or acceleration information. However, in another aspect, the input data 210 might explicitly exclude one or more of velocity data and/or acceleration data.

In one example, the input 210 might be one hundred samples (sampled at 100 Hz) to provide one hundred milliseconds of past pose history. This set of one hundred samples can be used to predict fifty milliseconds into the future. The number of samples in the past, the frequency as noted above, and the number of samples predicted in the future, or the future prediction time, can vary depending on the various factors disclosed herein including an estimate of the latency within the system.

The pose estimation engine 208 can be trained using various types of data (i.e., on position, velocity and acceleration) in order to process received data (i.e., only position data) according to a particular structure. For example, the pose estimation engine 208 can be trained using extended training data to expect to receive just pose information or pose and orientation data in six degrees of freedom. This is one example structure which can be the most flexible given the different types of controllers 202 that might be used in a system. In another example however, the pose estimation engine 208 can be trained to also receive other types of data such as velocity data and/or acceleration data in addition to or independent of pose and/or orientation pose data.

The input data 210 is received at a first layer 212 which can be in one aspect a fully connected layer or a dense layer. The layer 212 can also be other types of neural networks and have one or more layers. The layer 212 can act as an embedding layer to an autoencoder 214. The output of the layer 212 can be provided to the autoencoder 214. The autoencoder 214 can also have a variety of different types of neural network structures. One example structure is a bi-directional LSTM autoencoder. The autoencoder 214 can include an encoder 220 and a decoder 224. The encoder can learn time dependent features from an input time series 210. In this manner, for example, the encoder can be a two-layer bidirectional LSTM. The decoder 224 also may be a two-layer bidirectional LSTM. In FIG. 2B, the encoder 220 and decoder 224 are shown as being two-layer networks, but they may be one layer each or more than two layers as well.

The decoder 224 combines the encoder features into required features or a future timestamp. The final states from the encoder 220 are shared to the decoder 224 as its initial states. In some cases, the feature vector that is provided from the encoder 220 to the decoder 224 is repeated 222. The output of the autoencoder 214 is provided to an output layer 216 that can combine the decoder output into a pose for future timestamps. In one example, the output 218 of the output layer 216 can be a fully connected layer or a dense layer and the output 218 can be one or more six degrees of freedom poses. For example, if the input 210 is ten pose samples, which can include the most recent pose associated with the controller 202 and the previous nine historical poses, the set of ten poses can be processed by the pose estimation engine 208 to produce a set of five poses representing the estimated future poses which can then be provided to another computing device such as the server 206 and/or the headset 204 for rendering purposes. When there is latency in the system 200, the approach enables the future poses or output data 218 to be used in rending more in line with the timing of the actual movement of the controller 202. In many cases, the controller 202 can use the pose estimation engine 208 to the future pose so that the correct poses of the controller 202 are rendered in the scene on the headset 204 or other display.

The pose estimation engine 208 can be any one or more of the components shown in FIG. 2B. For example, it might just cover the autoencoder 214 and its subcomponents 220, 224. The pose estimation engine 208 can include the autoencoder 214 and one or more of the input layer 212 and/or the output layer 216. Furthermore, the different components can also be configured as different types of neural networks with different layer structures.

Figure 3:
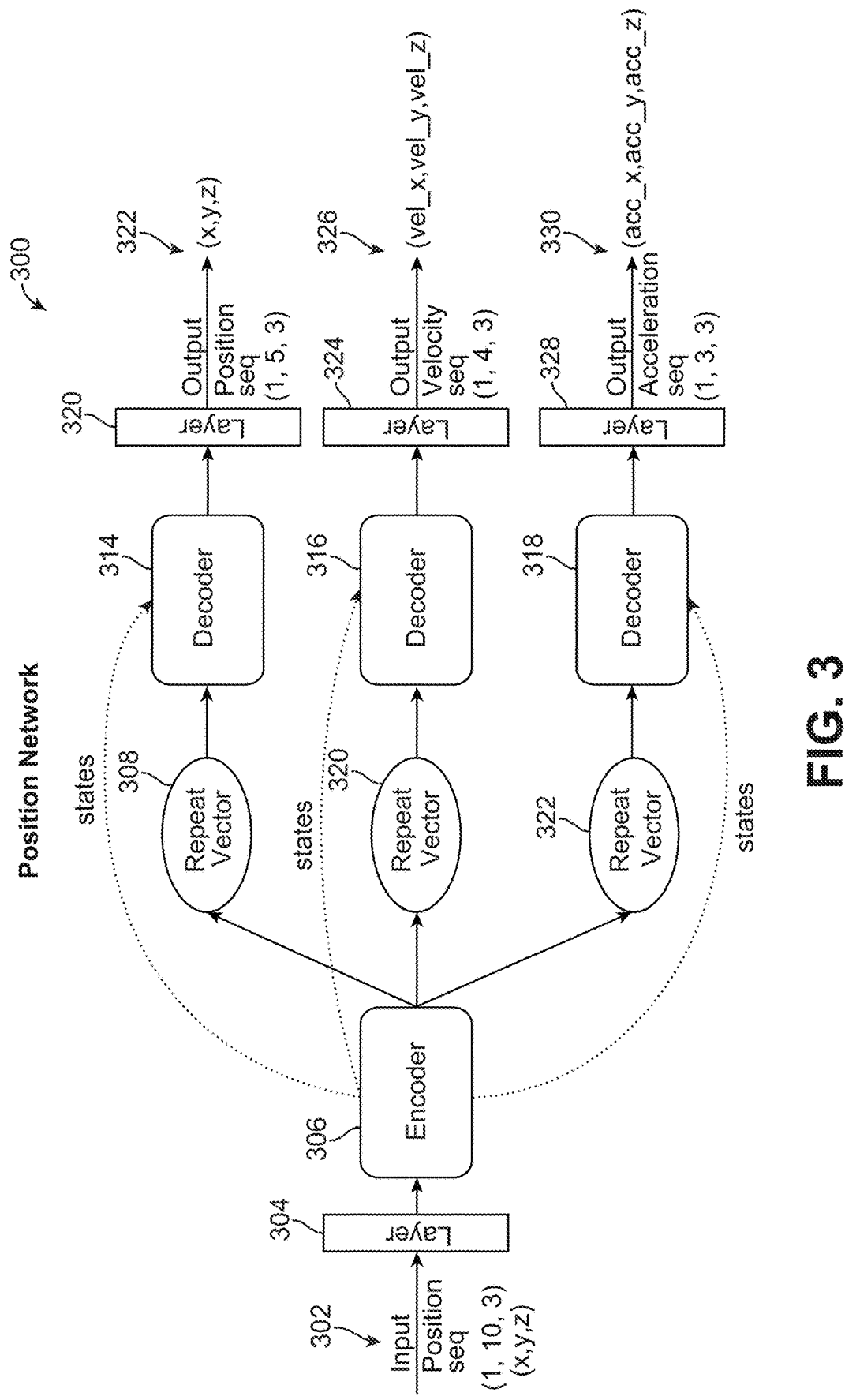
FIG. 3 is a diagram illustrating an example position network used to train a pose estimation engine, according to aspects of the disclosure.

FIG. 3 illustrates a position network 300 that can be used for training the pose estimation engine 208. The training disclosed in FIG. 3 illustrates how additional data (velocity, acceleration) can be used to train an encoder that will not be available in practice. In this example, the input is position information 302 to an input layer 304 (e.g., a fully connected layer or dense layer that outputs a feature vector). The data shown (1, 10, 3) as part of the input data 302 can represent a time sequence of samples of poses. For example, the "1" can represent the number of samples in the input 302. This could also be "N" indicating that there are N number of samples. The number "10" represents how many past samples there are in time or it can be characterized as a time-dependent dimension like 10 milliseconds meaning this data covers the past 10 ms. The value of 10 ms can be used if the frequency of pose data is 1000 HZ or it may be, for example, 100 ms if the frequency of the pose data is 100 Hz. The "3" can represent the number of dimensions or the number of positional data in that (x, y, z) has three values.

Data collection for training purposes can include six degrees of freedom data (x, y, z, q) such as translation data (x, y, z) and orientation (q) data that can be collected through the system. For example, Data can be collected using an opti-track system while people are playing numerous games on Oculus Quest. The opti-track system contains infrared cameras that track active and passive sensors. These sensors are placed on the Oculus Quest device to the pose information. Large amount data is required to train the network. The data can be in hundreds of thousands of samples and is divided into 3 sets: train, test and validation.

In this example, the input layer 304 can be "dense" meaning that the layer is deeply connected from its preceding layer which works for changing the dimension of the output by performing matrix vector multiplication. In any neural network, a dense layer is a layer that is deeply connected with its preceding layer which means the neurons of the layer are connected to every neuron of its preceding layer. This layer is the most commonly used layer in artificial neural network networks.

The input layer 304, when it is a dense layer, receives output from every neuron of its preceding layer, where neurons of the dense layer perform matrix-vector multiplication. Matrix vector multiplication is a procedure where the row vector of the output from the preceding layers is equal to the column vector of the dense layer. The general rule of matrix-vector multiplication is that the row vector must have as many columns like the column vector. The use of a dense layer is only be way of example as other layer structures can be used for the input layers and output layers disclosed herein.

The output of the input layer 304 can be provided to an encoder 306 that then provides its output as a vector to three different decoders 314, 316, 318. In each case, the respective states from the encoder 306 are shared to the decoders 314, 316, 318 as the respective initial state. The respective input vectors can be repeated to fill in any necessary data 308, 310, 312. The repeat vectors 308, 310, 312 can be time-based vectors and each respective decoder 314, 316, 318 will combine the respective repeated vector. The encoder 306 can be, for example, a two-layer bidirectional LSTM, or can be configured in some other neural network structure.

Each decoder 314, 316, 318 can be configured differently. For example, the decoder 314 outputs data to an output layer 330 that ultimately outputs position information 322 associated with the pose in the (x, y, z) format. The data shown as (1, 5, 3) in FIG. 3 can represent "1" for the number of samples. The number "5" can represent a timing of how many future samples are predicted and the number 3 can represent the (x, y, z) positional data structure or number of channels. The decoder 316 can provide its output data to an output layer 324 that can then output velocity data 326 in the (vel_x, vel_y, vel_z format). The output data 326 can relate to the values (1, 4, 3) which can represent a "1" for the number of samples. The value "4" can represent that the future velocity predictions are for 4 milliseconds or four samples into the future and the value "3" can represent the 3 data points for (vel_x, vel_y, vel_z). The decoder 318 can provide its output data to an output layer 328 that outputs acceleration data 330 in an (acc_x, acc_y, acc_z) format. The output data 330 which includes the values (1, 3, 3) can represent a "1" for the number of samples. The value "3" can represent that the future acceleration predictions are for 3 milliseconds or 3 samples into the future and the value "3" can represent the three data points for (acc_x, acc_y, acc_z).

Figure 5:
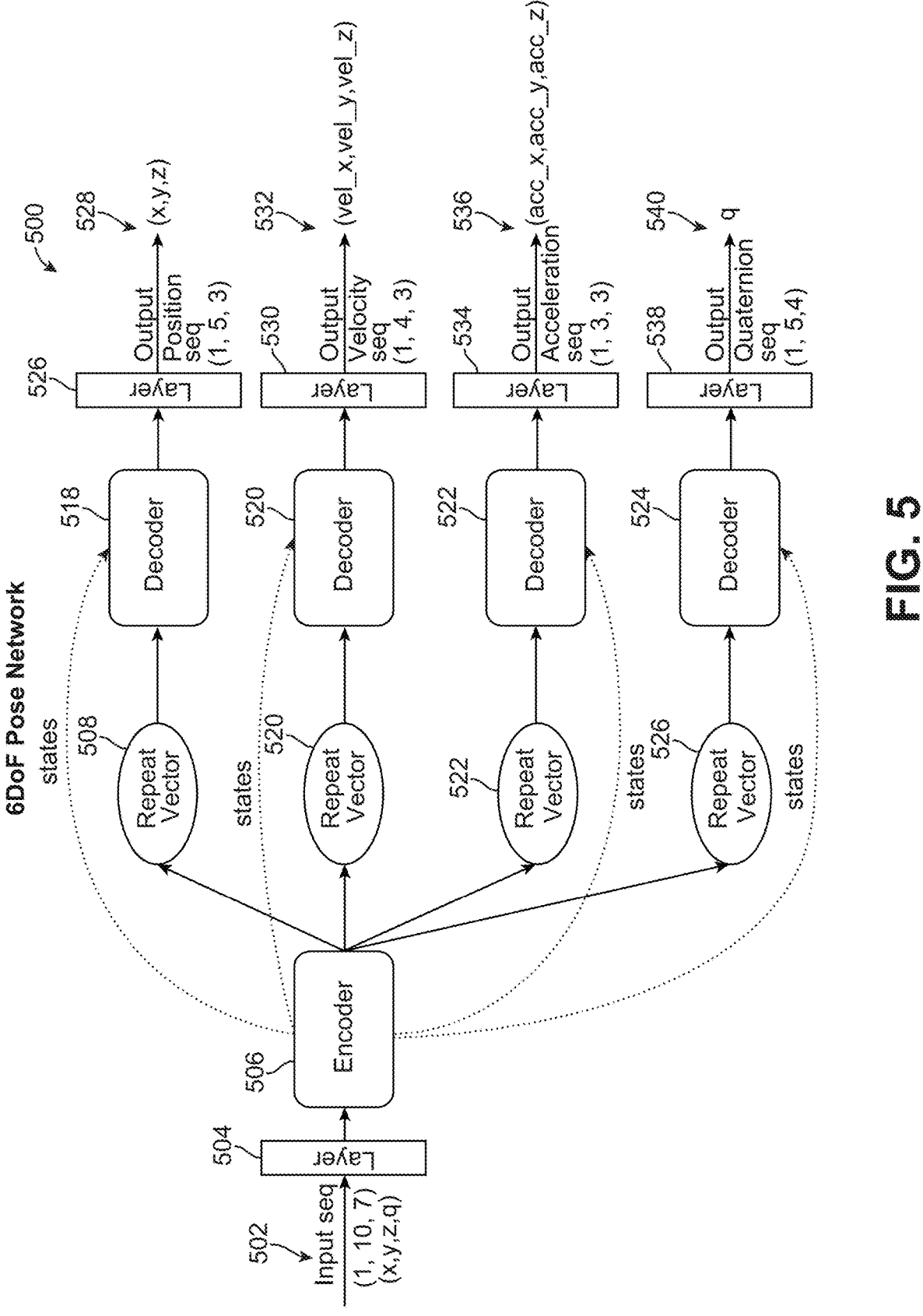
FIG. 5 is a diagram illustrating a six degrees of freedom pose network used to train a pose estimation engine, according to aspects of the disclosure.

The use of the position data (x, y, z) in FIG. 3 is for training purposes and in other training scenarios like is shown in FIG. 5 below, the training data could also include the quaternion data as well.

The purpose of this position network is to utilize in training the velocity and acceleration data such that in practice, when the pose estimation engine 208 is deployed, it can nevertheless receive input pose data that includes perhaps just position and/or orientation data and the engine can still output future poses 322 to be rendered.

In one example, the pose estimation network 208 is trained on more data that just the position and/or quaternion data. During training, the system can also obtain velocity and acceleration data as well. Thus, the pose estimation network 208 can be trained using more data or different types of data than what will be input in practice. For example, the velocity data 326 and the acceleration data 330 can be used in training and the back-propagation process for tuning the weights in the pose estimation network 208. Here, the velocity and acceleration data 326 is used for back-propagation purposes only, i.e., only during the training process to improve the position accuracy. In other cases, where velocity and acceleration are not available, the system uses the gradient of position as velocity and gradient of velocity as acceleration for back propagation.

Back-propagation is a part of neural net training. Back-propagation fine-tunes the weights of a neural net based on the error rate (i.e. loss) obtained in the previous epoch (i.e. iteration). Proper tuning of the weights ensures lower error rates, making the model reliable by increasing its generalization. In this case, the weights in the pose estimation network 208 and particularly in the encoder 306 can be tuned based on velocity and/or acceleration data. Using velocity and acceleration allows the system to improve its prediction of the final position. For example, the system may have the initial acceleration or velocity for a prediction of 10 milliseconds into the future. This is true even for orientation. For orientation, predicting rotational velocity is sufficient. Within 10 milliseconds, based on the knowledge of acceleration and/or velocity, the system can know how far any object will have traveled. Having or using the velocity and/or acceleration data during back-propagation, the system can learn the position better using the available kinematics for the neural network.

Back-propagation requires a loss function to determine how to tune the weights in the layers of a neural network. There are different loss functions. For the position network 300, the loss functions can include a mean absolute error (MAE) loss for the acceleration loss. This loss can be used for back-propagation for the acceleration data 330. For the velocity loss associated with the velocity data 326, a sum of the MAE of velocity and an MAE of a gradient of the velocity (i.e., the acceleration) can be used. For the position loss associated with the position data 322, the loss function can include a sum of the MAE of the position, the MAE of the gradient of position (i.e., velocity) and an MAE of the gradient of the gradient of position (i.e., the acceleration). In one example, the system may add up all the losses for back-propagation. The system may also provide equal weights to each loss function or may determine different weights for the different loss functions.

Using this approach shown in FIG. 3, the encoder 306 is trained using data from all the three different types of data including the position data 322, the velocity data 326 and the acceleration data 330. In practice, when the pose estimation engine 208 is active, the system only may receive position data and the encoder will have an improved output because it will have been trained on not only position data but also with velocity and acceleration data. The decoder 224 of FIG. 2 can correspond to or be the position decoder 314 of FIG. 3.

Figure 4:
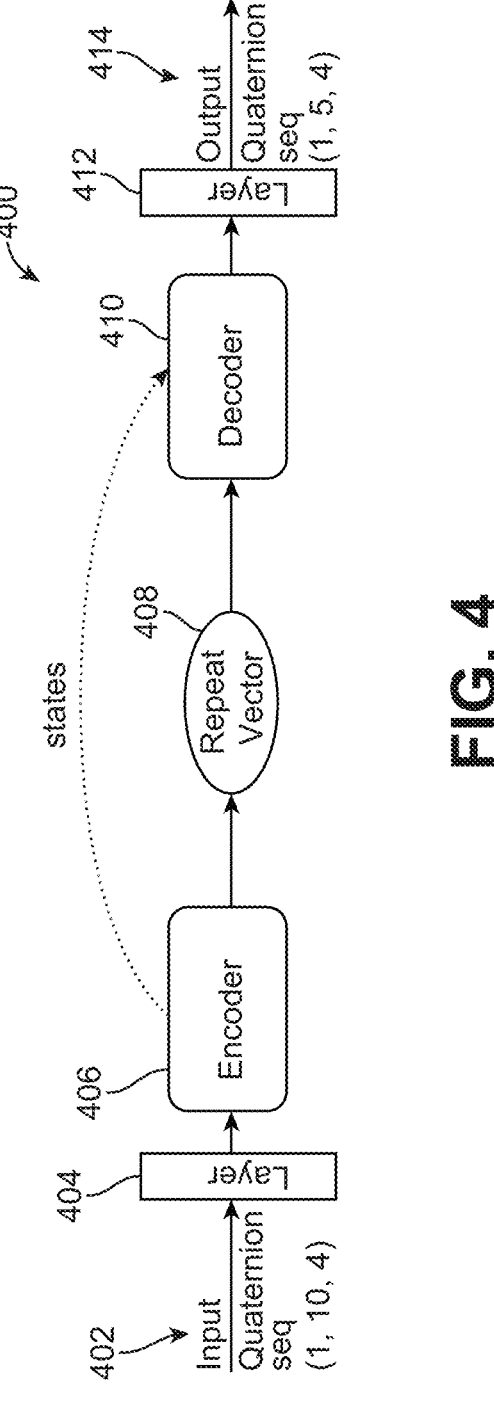
FIG. 4 is a diagram illustrating a quaternion network used to train a pose estimation engine, according to aspects of the disclosure.

FIG. 4 illustrates a quaternion network 400 that includes quaternion input 402 provided to an input layer 404. The quaternion network 400 can be shown as one example of how to train one or more component in the pose estimation engine 208. The output of the input layer is provided to an encoder 406 that provides its output to a decoder 410. A repeat vector 408 can be provided from the encoder 406 to the decoder 410. The state information can be shared from the encoder 406 to the decoder 410 as an initiate state. The encoder 406 and the decoder 410 can be, for example, a two-layer bidirectional LSTM. The output of the decoder 410 is provided to an output layer 412 which then outputs the quaternion data 414. The training of the quaternion network 400 can include as mentioned above using back-propagation based on an error rate obtained from a previous iteration.

For the quaternion network 400, the loss function can include a Δq=q_predicted*inv (q_true). The loss function can include L1 loss of Δq. The value Δq can represent the error in the position value or the error in the orientation. The L1 loss is another way of characterizing the absolute error loss and the cost is the mean of these absolute errors (MAE). In one example, the system may add up all of the different losses and can give equal weight to each loss value in the back-propagation process.

FIG. 5 shows a six degrees of freedom network 500 which is basically a combination of the position network 300 of FIG. 3 and the quaternion network 400 of FIG. 4. The input sequence 502 in this case can include the positional information as well as the quaternion (q) information. An input layer 504 (e.g., a dense layer) can receive the input information 502 and provided its output (e.g., a feature vector) to an encoder 506 which can be, for example, a two-layer bidirectional LSTM. There can be a set of decoders 518, 520, 522, 524 which can each be, by way of example, a two-layer bidirectional LSTM. The output state of the encoder 506 can be provided to each of the decoders 518, 520, 522, 524 as an initial state and an input vector can be repeated 508, 510, 512, 516 into each of the respective decoders 518, 520, 522, 524. The output of the decoder 518 is provided to an output layer 526 which can generate one or more output samples associated with position 528. The output of the decoder 520 is provided to an output layer 530 which can generate one or more output samples associated with velocity 532. The output of the decoder 522 is provided to an output layer 534 which can generate one or more output samples associated with acceleration 536. The output of the decoder 524 is provided to an output layer 538 which can generate one or more output samples associated with quaternion data 540. The training of the quaternion network 500 can include as mentioned above using back-propagation based on an error rate obtained from a previous iteration.

The training approach in FIG. 5 enables the encoder 506 to be trained using back-propagation data for position data 528, velocity data 532, acceleration data 536 and quaternion data 540. Then, when the encoder 506 is deployed with a position decoder 518, the system (pose estimation engine 208) can receive position and/or quaternion data 502 and produce better position output. The combined network is advantageous of determining the correlation between position and quaternion. Thus, the network learns the dependencies resulting in better six degrees of freedom pose. The loss functions mentioned below are to learn these interdependencies and thus improve the overall accuracy.

As noted above, the loss is used as part of the training process for determining weights of the pose estimation network 208. Calculating the loss typically relates to the difference between an actual output value and a predicted output value. In one aspect, this disclosure introduces a new loss value in order to properly train the pose estimation network 208. For the six degrees of freedom network 500, the loss function can be a six degrees of freedom pose loss which can be a total loss plus the position loss.

A new loss function can also be applied to the training process disclosed herein. For example, the position loss can be as mentioned above the sum of the MAE of position, the MAE of the gradient of the position and the MAE of the gradient of the gradient of the position. A rotational loss function can be:

$$\mathcal{L}_R = \left\| \text{axis} - \text{angle} - \text{magnitude}\big(\overline{R} \times R\big) \right\|_1$$

The "R" values relate to a rotational matrix. The R(bar) is the predicted rotational matrix and the "R" value is the actual rotational matrix value. The value or the rotation loss can relate to the error in the orientation between the predicted orientation and the target orientation. This value is similar to an MAE for the quaternion value.

An example rotation-translation loss can be:

$$\mathcal{L}_{Rt} = \left( \left\| \overline{t} - \overline{R} \times R^T \times t \right\|_1 + \left\| t - R \times \overline{R}^T \times \overline{t} \right\|_1 \right) \div 2$$

The "t" values represent position values (x, y, z) and the "R" values represent the quaternion or orientation values q. The loss calculated here relates to how accurate a rotation-translation prediction is to the target rotation-translation. Assume an original position t, if the system rotates on an axis from the original position using the R rotation matrix, if the system performs a reverse rotation operation to rotate back to the original position, if the predicted rotation-translation is accurate, the reverse rotation should come back to the same origin. If this occurs, then the total transformation is accurate. In this case, both the translation and orientation vectors are the same using a rotation translation loss. Thus, this loss function determines how close the predicted translation and orientation vector is to the target translation and orientation vector.

A translation loss (In other words, this is MAE of position) can be:

$$\mathcal{L}_t = \left\| \overline{t} - t \right\|_1$$

The translation is a simple equation of the translation points t in the (x, y, z) coordinate system between the predicted and the actual values.

A rotational-translation loss can be the rotation loss plus the rotation-translation loss plus the translation loss:

$$\mathcal{L}_{total} = \lambda_R \times \mathcal{L}_R + \lambda_{Rt} \times \mathcal{L}_{Rt} + \lambda_t \times \mathcal{L}_t,$$

where $$\lambda_R = 1, \lambda_{Rt} = 1, \lambda_t = 1$$

In one example, the loss for the six degrees of freedom pose can be the total loss above plus the position loss. Each loss type can be given an equal weight (or a value of 1 as shown in the rotational-translation loss equation above), or a different weight based on various factors. These various new loss functions can be use in the context of back-propagation of the loss to tune weights in the pose estimation engine 208. These loss functions are used in the back-propagation process.

There are a number of ways to improve the training process for the pose estimation engine 208 based on the principles disclosed above. In one aspect, an increase of training data can improve the model. In another aspect, a new loss function can be provided by combining the translation (FIG. 3) and orientation (FIG. 4) networks as shown in FIG. 5. The combination of these networks can help in improving the results as position and orientation are not independent from each other. By combining these networks to utilize a new loss function can leverage the inter-dependent relationship that can then be learned by the network in this process. This produces better results. Another way to improve the models can also include increasing the frequency of data capture beyond 100 Hz for example. In some cases, a sample frequency of data capture can be workable at about 100 Hz but in some cases the motion of the controller 202 might be at a higher speed and increasing the frequency of data capture can result in capturing better motions in the data. This adjustment of the sampling rate is one example of tuning the system based on factors such as latency, type of application, speed of movement of the controller 202 and so forth.

Figure 6:
FIG. 6 is a diagram illustrating an example of a method for operating a pose estimation engine, according to aspects of the disclosure.

FIG. 6 is a flow diagram illustrating an example of a method 600 of predicting a pose. At block 602 of method 600 can include receiving, at a pose estimation engine (e.g., the pose estimation engine 200 described with respect to FIG. 2), pose data from a controller. The pose data includes a plurality of previous poses of the controller. The pose data can exclude velocity data associated with the controller. In some cases, the pose estimation engine including an input layer providing input layer data to an autoencoder having an encoder and a decoder trained on observed training data and an output layer receiving autoencoder data from the autoencoder. In one aspect, the pose data can include only current pose data and past pose data from the controller. As shown in FIG. 2, the pose estimation engine 208 can be configured on one or more of the controller 202, a headset 206, or a computer in communication with the controller and/or the headset.

At block 604, the method 600 can include predicting, at a first time and via the pose estimation engine, a future pose of the controller based on the pose data, the future pose including an expected pose of the controller at a second time that is after the first time. The neural network suggested requires 'N' number of samples to predict the future 'M' number of samples. For a first 'N' samples, there are two ways the approach can determine the system: One way can include until N samples are collected for neural network, the computing device will keep the user doing the calibration poses, so the computing device can calibrate well without the need of predicting the future poses. Another approach can include until N poses are collected, the computing device can keep predicting the future poses with zeros for unknown or uncollected samples and correct the prediction as the computing device finishes collecting N samples. Once all N samples are collected, then the NN input is always available and it can work as usual from thereon.

In some cases, the method 600 can include determining or calculating a latency associated with transferring the pose data from the controller to one or more separate devices and/or processing the pose data via the pose estimation engine based on the latency. The pose data can be configured in six degrees of freedom (6DOF) or in some other format. The pose estimation engine can be trained on position data, orientation data, the velocity data, acceleration data, or any combination thereof. In some cases, the pose estimation engine can be trained at a chosen frequency that correlates to expected motion speed of the controller in use. In one illustrative example, the pose estimation engine 208 can be trained at a data frequency of 100-200 Hz. In other aspects, the data collection frequency can be above 200 Hz.

A loss function associated with training the pose estimation engine can be calculated by combining a position network and an orientation network, such as shown in FIG. 5. In one aspect, the encoder can learn time dependent features from the pose data and the decoder can combine the encoder features into a future timestamp. In one aspect, the input layer (e.g., the input 212 as shown in FIG. 2) can include a fully connected layer and the output layer (e.g., the output layer 216 of FIG. 2) can include a fully connected layer. In another aspect, the autoencoder (e.g., the autoencoder 214) can include a bi-direction long short-term memory (bi-LSTM) network. As shown in FIG. 2, states from the encoder 220 can be shared to the decoder 224 as an initial state as part of a training process of training the pose estimation engine. In some cases, the output layer 216 can combine an output from the decoder 224 to generate a six degrees of freedom pose for the future timestamp.

The pose estimation engine 208 can be trained using an acceleration loss, a velocity loss, a position loss, a quaternion loss, a rotation loss, a rotation-translation loss, a six degrees of freedom (6DOF) pose loss, or any combination thereof. The 6DOF pose loss can include a total loss plus a position loss. In another example, the acceleration loss can include a mean absolute error of acceleration. In another example, the velocity loss can include a sum of the mean absolute error of acceleration and a mean absolute error of a gradient of velocity. In another example, the position loss can include a sum of a mean absolute error of position, the mean absolute error of a gradient of position, and a mean absolute error of a gradient of the gradient of position.

In block 608, the method 600 can include rendering an image on a display based on the future pose. The encoder 220 can include a multi-layer bi-long short-term memory network. The decoder 224 can include another multi-layer bi-long short-term memory network. In one aspect the autoencoder 214 can provide a repeated vector from the encoder 220 to the decoder 224.

FIG. 7 is a flow diagram illustrating an example of a method 700 of predicting a pose. The method 700 is one example of operations of the pose estimation engine 208 based on different or dynamic latency values. At block 702, the method 700 can include determining or calculating a latency associated with transferring pose data from a controller to one or more separate device and/or processing the pose data via the pose estimation engine based on the latency. At block 704, the method 700 can include receiving, at a pose estimation engine, the pose data from the controller. As described above, the pose data includes a plurality of previous poses of the controller. In some cases, similar to that described above, the pose data excluding velocity data associated with the controller. The pose estimation engine can include an input layer providing input layer data to an autoencoder having an encoder and a decoder trained on observed training data and an output layer receiving autoencoder data from the autoencoder.

At block 706, the method 700 includes predicting, at a first time, according to the latency and via the pose estimation engine, a future pose of the controller based on the pose data, the future pose comprising an expected pose of the controller at a second time that is after the first time. At block 708, the method 700 can include rendering, on a display, an image based on the future pose.

The systems and techniques described herein can apply to computing system (e.g., an XR system such as an AR and/or VR system) that can utilize a future pose predictor to determine future six degrees of freedom poses so that the correct poses of the controller are rendered on a display in a scene. Any controller that is wireless or wired where latency exists can utilize these principles. For example, the controller may include a split XR controller of an XR system, an internal ultrasound controller, or other controller.

In some examples, the processes described herein (e.g., method 600, method 700 and/or other process described herein) may be performed by a computing device or apparatus. In one example, the methods 600, 700 can be performed by the computing system 800 shown in FIG. FIG. 8 or the systems disclosed in FIGS. 2A and 2B.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the method 500 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The methods 600, 700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods 600, 700 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
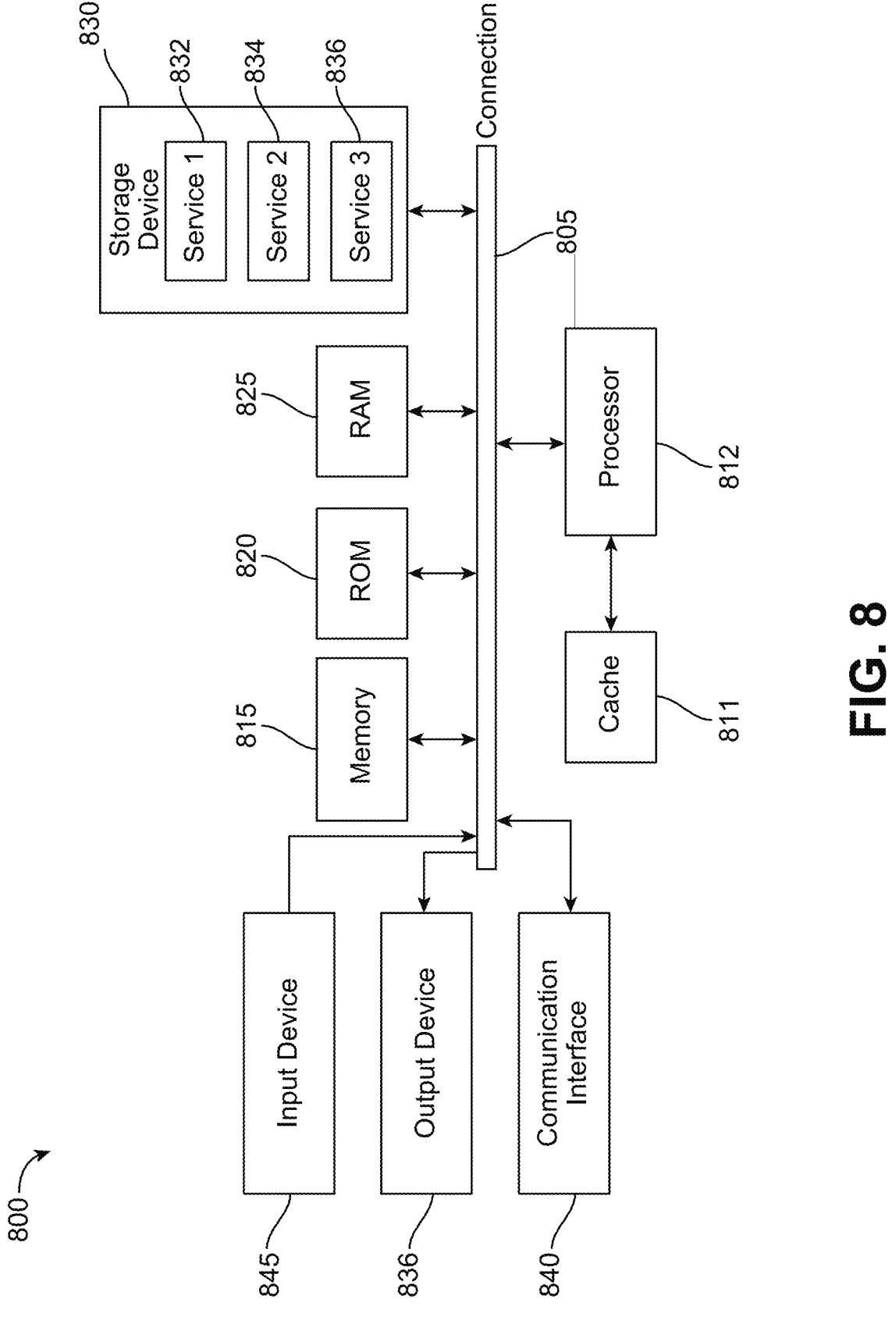
FIG. 8 is a diagram illustrating an example of a computing system, according to aspects of the disclosure.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some aspects, computing system 800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache 811 of high-speed memory connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 840 may also include one or more GNSS receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Master-card and Visa (EMV) chip, a subscriber identity module (SIM) card, a mini/micro/nano/pico SIM card, another inte-grated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEP-ROM), cache memory (L1/L2/L3/L4/L5/L #), resistive ran-dom-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some aspects, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and vari-ous other mediums capable of storing, containing, or carry-ing instruction(s) and/or data. A computer-readable medium may include a non-transitory medium in which data can be stored and that does not include carrier waves and/or tran-sitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory con-tents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of expla-nation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown with-out unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termina-tion can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose com-puter, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, net-worked storage devices, and so on.

Devices implementing processes and methods according to these disclosures can include hardware, software, firm-ware, middleware, microcode, hardware description lan-guages, or any combination thereof, and can take any of a variety of form factors. When implemented in software, firmware, middleware, or microcode, the program code or code segments to perform the necessary tasks (e.g., a com-puter-program product) may be stored in a computer-read-able or machine-readable medium. A processor(s) may per-form the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other struc-tures for supporting such computing resources are example means for providing the functions described in the disclo-sure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such varia- tions, except as limited by the prior art. Various features and aspects of the above-described application may be used individually or jointly. Further, aspects can be utilized in any number of environments and applications beyond those described herein without departing from the broader spirit and scope of the specification. The specification and draw- ings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other com- ponent over a wired or wireless connection, and/or other suitable communication interface) either directly or indi- rectly.

Claim language or other language in the disclosure recit- ing "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the examples disclosed herein may be implemented as electronic hardware, computer software, firmware, or com- binations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be imple- mented in electronic hardware, computer software, firm- ware, or any combination thereof. Such techniques may be implemented in any of a variety of devices such as general purposes computers, wireless communication device hand- sets, or integrated circuit devices having multiple uses including application in wireless communication device handsets and other devices. Any features described as mod- ules, engines, or components may be implemented together in an integrated logic device or separately as discrete but interoperable logic devices. If implemented in software, then the techniques may be realized at least in part by a computer- readable data storage medium including program code including instructions that, when executed, performs one or more of the methods, algorithms, and/or operations described above. The computer-readable data storage medium may form part of a computer program product, which may include packaging materials. The computer- readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose micropro- cessors, an application specific integrated circuits (ASICs), field programmable logic arrays (FPGAs), or other equiva- lent integrated or discrete logic circuitry. Such a processor may be configured to perform any of the techniques described in this disclosure. A general-purpose processor may be a microprocessor; but in the alternative, the proces- sor may be any conventional processor, controller, micro- controller, or state machine. A processor may also be imple- mented as a combination of computing devices, e.g., a combination of a DSP and a microprocessor, a plurality of microprocessors, one or more microprocessors in conjunc- tion with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Disclosure Include

Aspect 1. A processor-implemented method of predicting a pose, the method comprising: receiving, at a pose estima- tion engine, pose data from a controller, the pose data including a plurality of previous poses of the controller; and predicting, at a first time via the pose estimation engine, a future pose of the controller based on the pose data, the future pose comprising an expected pose of the controller at a second time that is after the first time.

Aspect 2. The processor-implemented method of Aspect 1, wherein the pose data comprises only current pose data and the plurality of previous poses from the controller.

Aspect 3. The processor-implemented method of any of Aspects 1 or 2, wherein the pose estimation engine is configured on at least one of the controller, a headset in communication with the controller, or a computer in com- munication with at least one of the controller or the headset.

Aspect 4. The processor-implemented method of any of Aspects 1 to 3, further comprising: determining a latency associated with at least one of transferring the pose data from the controller to one or more devices or processing the pose data via the pose estimation engine based on the latency.

Aspect 5. The processor-implemented method of any of Aspects 1 to 4, wherein the pose data is configured in six degrees of freedom.

Aspect 6. The processor-implemented method of any of Aspects 1 to 5, wherein the pose estimation engine is trained using at least one of position data, orientation data, velocity data, or acceleration data.

Aspect 7. The processor-implemented method of any of Aspects 1 to 6, wherein the pose estimation engine comprises an input layer providing input layer data to an autoencoder having an encoder and a decoder trained on observed training data, and an output layer receiving autoencoder data from the autoencoder.

Aspect 8. The processor-implemented method of Aspect 7, wherein the encoder learns time dependent features from the pose data and the decoder combines features output by the encoder into a future timestamp.

Aspect 9. The processor-implemented method of any of Aspects 7 or 8, wherein the input layer comprises a fully connected layer, the output layer comprises a fully connected layer, and wherein the autoencoder comprises a bi-long short-term memory network.

Aspect 10. The processor-implemented method of any of Aspects 7 to 9, wherein states from the encoder are shared to the decoder as an initial state as part of training the pose estimation engine.

Aspect 11. The processor-implemented method of any of Aspects 7 to 10, wherein the output layer combines an output from the decoder to generate a six degrees of freedom pose for the future timestamp.

Aspect 12. The processor-implemented method of any of Aspects 7 to 11, wherein the encoder comprises a first multi-layer bi-long short-term memory network and wherein the decoder comprises a second multi-layer bi-long short-term memory network.

Aspect 13. The processor-implemented method of any of Aspects 7 to 12, wherein the autoencoder provides a repeated vector from the encoder to the decoder.

Aspect 14. The processor-implemented method of any of Aspects 1 to 13, wherein the pose estimation engine is trained using at least one of an acceleration loss, a velocity loss, a position loss, a quaternion loss, a rotation loss, a rotation-translation loss, or a six degrees of freedom pose loss.

Aspect 15. The processor-implemented method of Aspect 14, wherein the six degrees of freedom pose loss comprises a total loss plus a position loss.

Aspect 16. The processor-implemented method of any of Aspects 14 or 15, wherein the acceleration loss comprises a mean absolute error of acceleration, the velocity loss comprises a sum of the mean absolute error of acceleration and a mean absolute error of a gradient of velocity, and the position loss comprises a sum of a mean absolute error of position, the mean absolute error of a gradient of position, and a mean absolute error of a gradient of the gradient of position.

Aspect 17. The processor-implemented method of any of Aspects 1 to 16, further comprising: rendering an image on a display based on the future pose.

Aspect 18. The processor-implemented method of any of Aspects 1 to 17, wherein the pose data excludes velocity data associated with the controller.

Aspect 19. An apparatus for predicting a pose, the apparatus comprising: at least one memory; and at least one processor coupled to at least one memory and configured to: receive, at a pose estimation engine, pose data from a controller, the pose data including a plurality of previous poses of the controller; and predict, at a first time via the pose estimation engine, a future pose of the controller based on the pose data, the future pose comprising an expected pose of the controller at a second time that is after the first time.

Aspect 20. The apparatus of Aspect 19, wherein the pose data comprises only current pose data and the plurality of previous poses from the controller.

Aspect 21. The apparatus of any of Aspects 19 or 20, wherein the pose estimation engine is configured on at least one of the controller, a headset in communication with the controller, or a computer in communication with at least one of the controller or the headset.

Aspect 22. The apparatus of any of Aspects 19 to 21, wherein the at least one processor coupled to at least one memory is further configured to: determine a latency associated with at least one of transferring the pose data from the controller to one or more devices or processing the pose data via the pose estimation engine based on the latency.

Aspect 23. The apparatus of any of Aspects 19 to 22, wherein the pose data is configured in six degrees of freedom.

Aspect 24. The apparatus of any of Aspects 19 to 23, wherein the pose estimation engine is trained using at least one of position data, orientation data, velocity data, or acceleration data.

Aspect 25. The apparatus of any of Aspects 19 to 24, wherein the pose estimation engine comprises an input layer providing input layer data to an autoencoder having an encoder and a decoder trained on observed training data, and an output layer receiving autoencoder data from the autoencoder.

Aspect 26. The apparatus of Aspect 25, wherein the encoder learns time dependent features from the pose data and the decoder combines features output by the encoder into a future timestamp.

Aspect 27. The apparatus of any of Aspects 25 or 26, wherein the input layer comprises a fully connected layer, the output layer comprises a fully connected layer, and wherein the autoencoder comprises a bi-long short-term memory network.

Aspect 28. The apparatus of any of Aspects 25 to 27, wherein states from the encoder are shared to the decoder as an initial state as part of training the pose estimation engine.

Aspect 29. The apparatus of any of Aspects 27 to 28, wherein the output layer combines an output from the decoder to generate a six degrees of freedom pose for the future timestamp.

Aspect 30. The apparatus of any of Aspects 25 to 29, wherein the encoder comprises a first multi-layer bi-long short-term memory network and wherein the decoder comprises a second multi-layer bi-long short-term memory network.

Aspect 31. The apparatus of any of Aspects 25 to 30, wherein the autoencoder provides a repeated vector from the encoder to the decoder.

Aspect 32. The apparatus of any of Aspects 19 to 31, wherein the pose estimation engine is trained using at least one of an acceleration loss, a velocity loss, a position loss, a quaternion loss, a rotation loss, a rotation-translation loss, or a six degrees of freedom pose loss.

Aspect 33. The apparatus of Aspect 32, wherein the acceleration loss comprises a mean absolute error of acceleration, the velocity loss comprises a sum of the mean absolute error of acceleration and a mean absolute error of a gradient of velocity, and the position loss comprises a sum of a mean absolute error of position, the mean absolute error of a gradient of position, and a mean absolute error of a gradient of the gradient of position.

Aspect 34. The apparatus of any of Aspects 32 or 33, wherein the six degrees of freedom pose loss comprises a total loss plus a position loss.

Aspect 35. The apparatus of any of Aspects 19 to 34, wherein the at least one processor coupled to at least one memory is further configured to: render an image on a display based on the future pose.

Aspect 36. The apparatus of any of Aspects 19 to 35, wherein the pose data excludes velocity data associated with the controller.

Aspect 37. A processor-implemented method of predicting a pose, the method comprising: determining a latency associated with at least one of transferring pose data from a controller to one or more devices or processing the pose data via a pose estimation engine based on the latency; receiving, at the pose estimation engine, the pose data from the controller, the pose data including a plurality of previous poses of the controller; predicting, according to the latency via the pose estimation engine at a first time, a future pose of the controller based on the pose data, the future pose comprising an expected pose of the controller at a second time that is after the first time; and rendering, on a display, an image based on the future pose.

Aspect 38. An apparatus for predicting a pose, the apparatus comprising: at least one memory; and at least one processor coupled to at least one memory and configured to: determine a latency associated with at least one of transferring pose data from a controller to one or more devices or processing the pose data via a pose estimation engine based on the latency; receive, at the pose estimation engine, the pose data from the controller, the pose data including a plurality of previous poses of the controller; predict, according to the latency via the pose estimation engine at a first time, a future pose of the controller based on the pose data, the future pose comprising an expected pose of the controller at a second time that is after the first time; and render, on a display, an image based on the future pose.

Aspect 39. A non-transitory computer-readable medium having stored thereon instructions that, when executed by one or more processors, cause the one or more processors to perform operations according to any of Aspects 1 to 18 and/or 37.

Aspect 40. An apparatus for classifying image data on a mobile device, the apparatus including one or more means for performing operations according to any of Aspects 1 to 18 and/or 37

What is claimed is:

1. An apparatus for predicting a pose, the apparatus comprising:

at least one memory; and at least one processor coupled to at least one memory and configured to:

receive, via a pose estimation engine, pose data from a controller, the pose data including a plurality of previous poses of the controller, and wherein the pose data excludes velocity data associated with the controller;

determine a latency associated with at least one of transferring the pose data from the controller to one or more devices or processing the pose data via the pose estimation engine; and predict, at a first time via the pose estimation engine based on the latency, a future pose of the controller based on the pose data, the future pose comprising an expected pose of the controller at a second time that is after the first time.

2. The apparatus of claim 1, wherein the pose data comprises only current pose data and the plurality of previous poses from the controller.

3. The apparatus of claim 1, wherein the pose estimation engine is configured on at least one of the controller, a headset in communication with the controller, or a computer in communication with at least one of the controller or the headset.

4. The apparatus of claim 1, wherein the pose data is configured in six degrees of freedom.

5. The apparatus of claim 1, wherein the pose estimation engine is trained using at least one of position data, orientation data, velocity data, or acceleration data.

6. The apparatus of claim 1, wherein the pose estimation engine comprises an input layer providing input layer data to an autoencoder having an encoder and a decoder trained on observed training data, and an output layer receiving autoencoder data from the autoencoder.

7. The apparatus of claim 6, wherein the encoder learns time dependent features from the pose data and the decoder combines features output by the encoder into a future timestamp.

8. The apparatus of claim 7, wherein the input layer comprises a fully connected layer, the output layer comprises a fully connected layer, and wherein the autoencoder comprises a bi-long short-term memory network.

9. The apparatus of claim 8, wherein states from the encoder are shared to the decoder as an initial state as part of training the pose estimation engine.

10. The apparatus of claim 8, wherein the output layer combines an output from the decoder to generate a six degrees of freedom pose for the future timestamp.

11. The apparatus of claim 6, wherein the encoder comprises a first multi-layer bi-long short-term memory network and wherein the decoder comprises a second multi-layer bi-long short-term memory network.

12. The apparatus of claim 6, wherein the autoencoder provides a repeated vector from the encoder to the decoder.

13. The apparatus of claim 1, wherein the pose estimation engine is trained using at least one of an acceleration loss, a velocity loss, a position loss, a quaternion loss, a rotation loss, a rotation-translation loss, or a six degrees of freedom pose loss.

14. The apparatus of claim 13, wherein the acceleration loss comprises a mean absolute error of acceleration, the velocity loss comprises a sum of the mean absolute error of acceleration and a mean absolute error of a gradient of velocity, and the position loss comprises a sum of a mean absolute error of position, the mean absolute error of a gradient of position, and a mean absolute error of a gradient of the gradient of position.

15. The apparatus of claim 14, wherein the six degrees of freedom pose loss comprises a total loss plus a position loss.

16. The apparatus of claim 1, wherein the at least one processor is configured to:

render an image on a display based on the future pose.

17. A method of predicting a pose, the method comprising:

receiving, at a pose estimation engine, pose data from a controller, the pose data including a plurality of previous poses of the controller, wherein the pose data excludes velocity data associated with the controller;

determining a latency associated with at least one of transferring the pose data from the controller to one or more devices or processing the pose data via the pose estimation engine; and predicting, at a first time via the pose estimation engine based on the latency, a future pose of the controller based on the pose data, the future pose comprising an expected pose of the controller at a second time that is after the first time.

18. The method of claim 17, wherein the pose data comprises only current pose data and the plurality of previous poses from the controller.

19. The method of claim 17, wherein the pose estimation engine is configured on at least one of the controller, a headset in communication with the controller, or a computer in communication with at least one of the controller or the headset.

20. The method of claim 17, wherein the pose estimation engine comprises an input layer providing input layer data to an autoencoder having an encoder and a decoder trained on observed training data, and an output layer receiving autoencoder data from the autoencoder.

21. The method of claim 20, wherein:

the encoder learns time dependent features from the pose data;

the decoder combines features output by the encoder into a future timestamp;

the input layer comprises a fully connected layer;

the output layer comprises a fully connected layer; and the autoencoder comprises a bi-long short-term memory network.

22. The method of claim 21, wherein states from the encoder are shared to the decoder as an initial state as part of training the pose estimation engine.

23. The method of claim 21, wherein the output layer combines an output from the decoder to generate a six degrees of freedom pose for the future timestamp.

24. The method of claim 17, wherein the pose estimation engine is trained using at least one of an acceleration loss, a velocity loss, a position loss, a quaternion loss, a rotation loss, a rotation-translation loss, or a six degrees of freedom pose loss.

25. The method of claim 24, wherein the acceleration loss comprises a mean absolute error of acceleration, the velocity loss comprises a sum of the mean absolute error of acceleration and a mean absolute error of a gradient of velocity, the position loss comprises a sum of a mean absolute error of position, the mean absolute error of a gradient of position, and a mean absolute error of a gradient of the gradient of position, and the six degrees of freedom pose loss comprises a total loss plus a position loss.

26. The method of claim 17, further comprising:

rendering an image on a display based on the future pose.

* * * * *